(12) United States Patent
Mortensen (10) Patent No.: US 7,150,289 B2
(45) Date of Patent: Dec. 19, 2006

(54) REMOVABLE, SNAP-ON SADDLE AND TAP FOR IRRIGATION PIPES

(75) Inventor: Mark A. Mortensen, Wheatridge, CO (US)

(73) Assignee: Duane D. Robertson, Golden, CO (US)

( * ) Notice: Subject to any disclaimer, the term of this patent is extended or adjusted under 35 U.S.C. 154(b) by 180 days.

(21) Appl. No.: 10/950,080

(22) Filed: Sep. 27, 2004

(65) Prior Publication Data

US 2006/0065306 A1    Mar. 30, 2006

(51) Int. Cl.
    *F16L 41/12*    (2006.01)
(52) U.S. Cl. ..................... 137/318; 285/197
(58) Field of Classification Search ............... 137/318; 285/197
    See application file for complete search history.

(56) References Cited

U.S. PATENT DOCUMENTS

| | | |
|---|---|---|
| 4,789,189 A | 12/1988 | Robertson |
| 5,694,972 A | 12/1997 | King |
| 6,216,723 B1 | 4/2001 | King |
| 6,357,472 B1 | 3/2002 | King |
| 6,510,865 B1 | 1/2003 | King |
| 6,767,033 B1 | 7/2004 | King |
| 6,986,532 B1 * | 1/2006 | King .................. 285/197 |

\* cited by examiner

*Primary Examiner*—Kevin Lee
(74) *Attorney, Agent, or Firm*—W. Scott Carson (57) ABSTRACT

A saddle and tap for lawn and similar irrigation systems. The saddle includes a base portion that snaps on the delivery pipe of the system and a pair of threaded, upright portions that extend upwardly from it. The tap includes a piercing member, barrel section, and threaded annular nut. In operation, the barrel section helps to guide the threaded upright portions of the saddle into the threaded annular nut of the tap. Rotation of the nut then advances the piercing member into the pipe. The tap is releasably lockable on the saddle and the piercing member of the tap is provided with holes with radiused or rounded edges to prevent creating undesirable shavings as the tap is advanced through the pipe wall.

30 Claims, 6 Drawing Sheets

REMOVABLE, SNAP-ON SADDLE AND TAP FOR IRRIGATION PIPES

BACKGROUND OF THE INVENTION

1. Field of the Invention

This invention relates to the field of saddles and taps for irrigation pipes.

2. Discussion of the Background

Lawn and similar irrigation systems commonly use flexible main pipes of plastics such as polyethylene. Such flexible main pipes can then be easily tapped along their lengths to create branch lines leading to sprinkler heads and other attachments. Self-tapping arrangements are very popular in this regard wherein a saddle is typically mounted on the pipe and a tap is advanced relative to the saddle to pierce the pipe. The tap remains in place on the saddle and the sprinkler head or other attachment is then connected to it.

Current self-tapping arrangements commonly have relatively complicated saddles with hinged or pivoted pieces that must be positioned about the pipe and then secured together. Still other saddles have pieces that must be axially slid relative to each other into engagement. Such hinged and sliding engagements in certain circumstances may be cumbersome to accomplish in the field and may be prone to coming undone.

Several self-tapping arrangements also have structures for locking the tap in place on the saddle once the pipe is pierced. These are desirable because the tap will then not be unscrewed from the saddle when the sprinkler head or other attachment is rotatably adjusted or replaced. In particular, sprinkler heads are normally screwed into tight engagement with the tap or a nipple on the tap and subsequently aimed as desired to an area of the lawn. However, if the sprinkler head later needs adjustment and is rotated to do so, such rotation may also undesirably rotate and loosen the tap from the saddle if the tap is not locked in place. If the head or other attachment needs to be totally removed to be cleaned or replaced and is unscrewed to do so, it can similarly loosen and completely remove the tap with it. Consequently, it is desirable to be able to lock the tap in place on the saddle. Unfortunately, known arrangements that currently lock the tap in place on the saddle are not releasable. Therefore, if the situation arises that it is necessary or desirable to remove the tap to replace or clean it, the locking mechanism must be physically broken or otherwise destroyed to do so and the tap and saddle cannot be reused.

With this and other problems in mind, the present invention was developed. In it, a resilient, one-piece saddle is provided that can be easily snapped on the pipe. A tap is also provided that can be releasably locked on the saddle so the saddle and tap can be removed and reused as desired. Other desirable features are additionally included in the saddle and tap arrangement of the present invention.

SUMMARY OF THE INVENTION

This invention involves a saddle and tap for lawn and similar irrigation systems. The saddle preferably is of one-piece design and includes a base portion that snaps on the delivery pipe of the system and a pair of threaded, upright portions that extend upwardly from it. The tap includes a piercing member, barrel section, and threaded annular nut. In operation, the barrel section of the tap helps to guide the threaded upright portions of the saddle into the threaded annular nut of the tap. Rotation of the nut then advances the piercing member into the pipe.

The tap is releasably lockable on the saddle and can be easily and quickly removed from the saddle without damaging any its parts or any parts of the saddle. The tap can then be cleaned if needed or replaced if damaged. Additionally, the saddle can also be quickly and easily removed from the pipe if desired and the removed saddle and tap combination reused. The piercing member of the tap is also provided with holes at its tip section wherein the holes have rounded or radiused edges. In operation, the rounded edges prevent or at least substantially reduce the creation of any undesirable shavings as the piercing tip section and holes are advanced through the pipe wall.

DETAILED DESCRIPTION OF THE INVENTION

Figure 1:
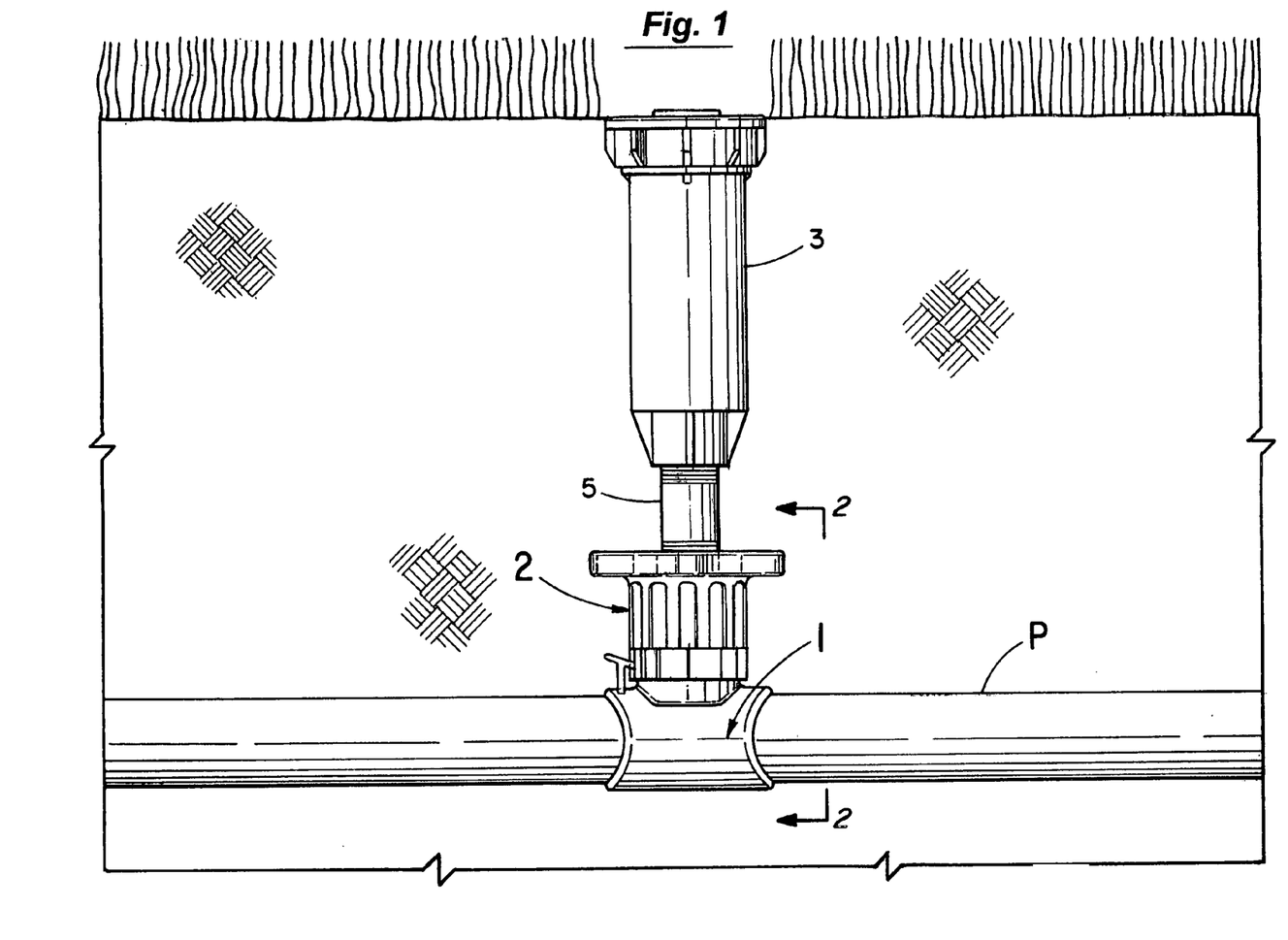
FIG. 1 illustrates the combination of the saddle and tap of the present invention in use in a lawn irrigation system.
Figure 2:
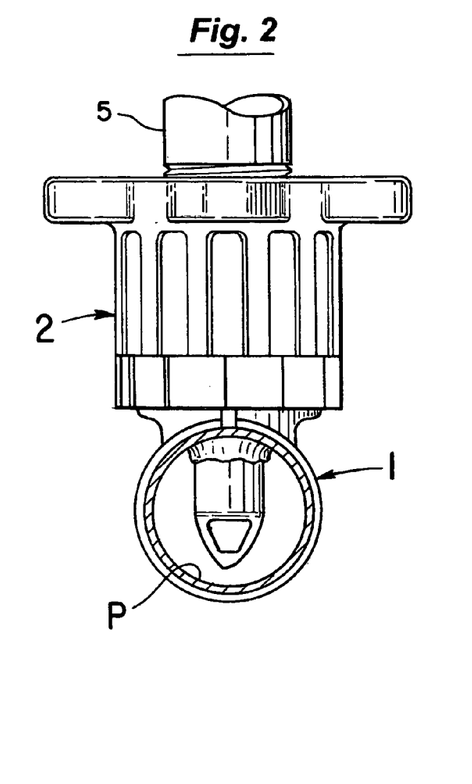
FIG. 2 is a view taken along line 2—2 of FIG. 1.

The pipe saddle 1 and tap 2 of the present invention are illustrated in FIGS. 1 and 2 in use mounted on a delivery pipe P of a lawn or similar irrigation system. A riser and sprinkler head 3 or other attachment (FIG. 1) can then be mounted as shown by a nipple 5 or other arrangement to the tap 2.

Figure 3:
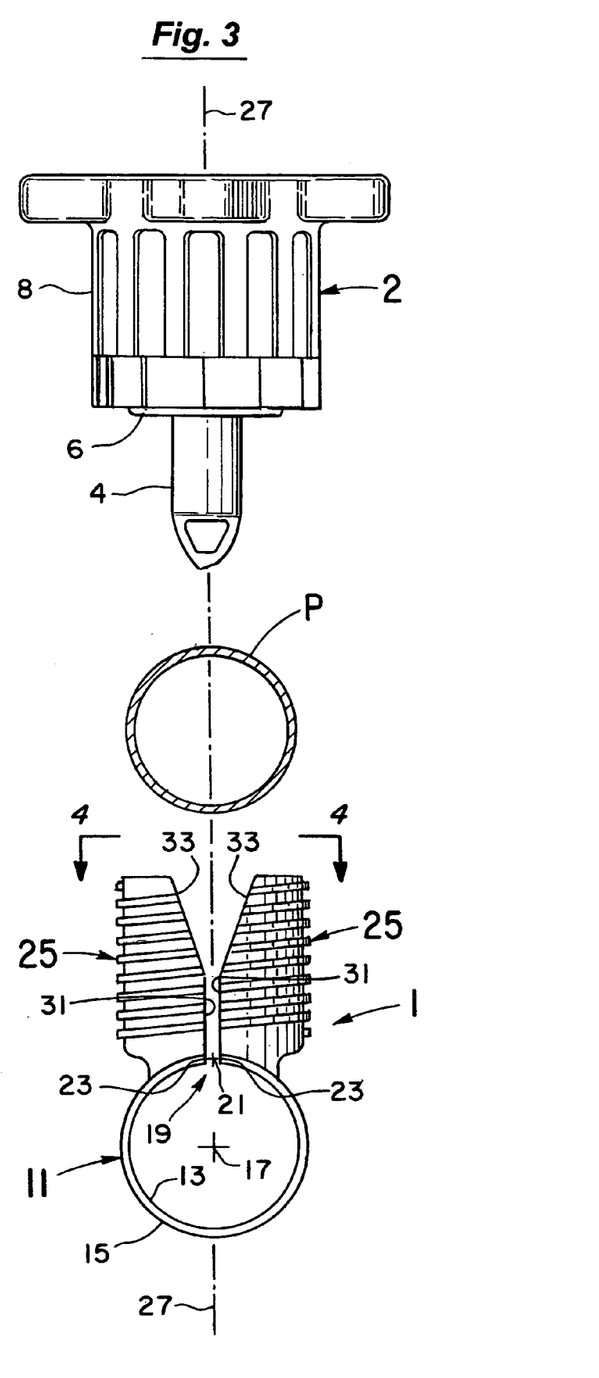
FIG. 3 is an exploded view of the tap and saddle of the present invention and the delivery pipe on which they will be mounted.
Figure 4:
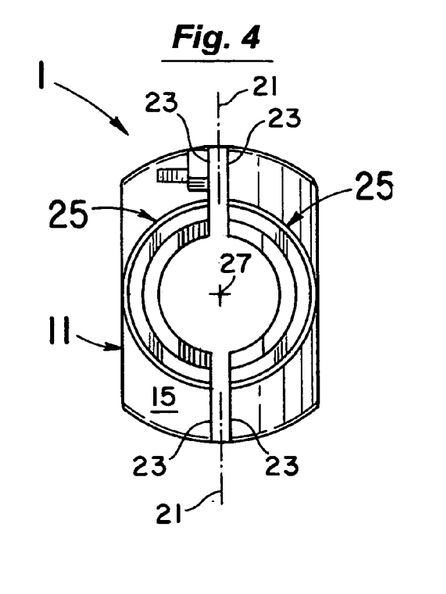
FIG. 4 is a view taken along line 4—4 of FIG. 3.

Referring first to the saddle 1 of the present invention and as shown in the exploded view of FIG. 3 and carrying over to FIGS. 4–8, the saddle 1 preferably snaps on the pipe P as illustrated in the sequence of FIG. 5–8. More specifically, the saddle 1 is preferably of one-piece construction and made of a flexible and resilient plastic (e.g., glass-reinforced nylon). The saddle 1 includes a base portion 11 (see FIG. 3) with two upright portions 25 extending upwardly therefrom. The base portion 11 has inner and outer surfaces 13 and 15 (FIG. 3) extending along and about the axis 17. The base portion 11 further includes a split at 19 between the inner and outer surfaces 13,15. The split 19 extends along the axis 21 which is spaced from and substantially parallel to the axis 17. In this manner, border surfaces 23 (FIGS. 3–4) are formed extending respectively between the inner and outer surfaces 13,15 on either side of the split 19. As indicated above, the saddle 1 further includes at least two upright portions 25 extending outwardly of the base portion 11 on respective sides of the split 19. The upright portions 25 as shown extend substantially along and about the axis 27 (FIGS. 3–4) which is substantially perpendicular to the axes 17 and 21.

In the relaxed or unflexed position of the saddle 1 in FIG. 3, the border surfaces 23 of the base portion 11 are substantially parallel to the axis 27 and substantially abutting one another. Additionally, at least the first border surfaces 31 (see again FIG. 3) of the respective upright portions 25 are also substantially abutting one another and substantially parallel to the axis 27. Further, the upright portions 25 of FIG. 3 preferably include second border surfaces 33 which are inclined to the axis 27 at an acute angle (e.g., 20 degrees). The inclined surfaces 33 as shown extend outwardly of each other above the surfaces 31 to form a substantially V-shape.

Figure 5:
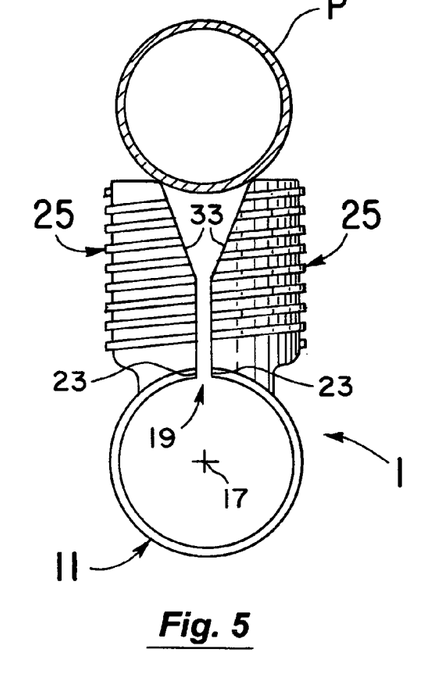
FIGS. 5–8 sequentially illustrate the manner in which the saddle in mounted on the pipe.
Figure 6:
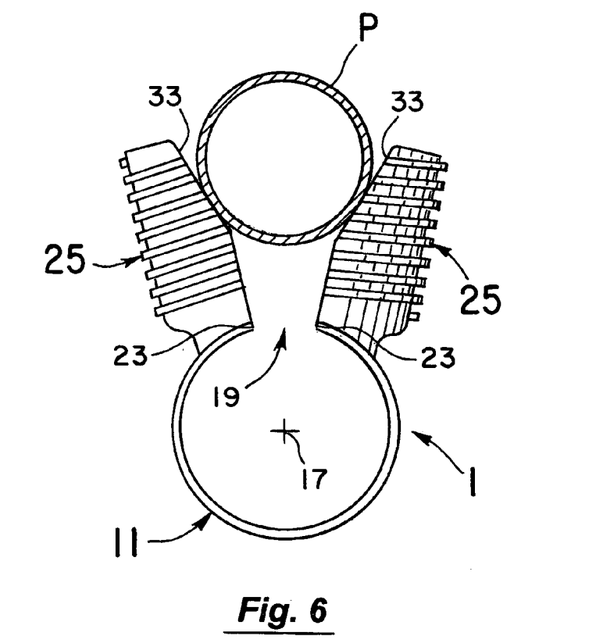
Figure 7:
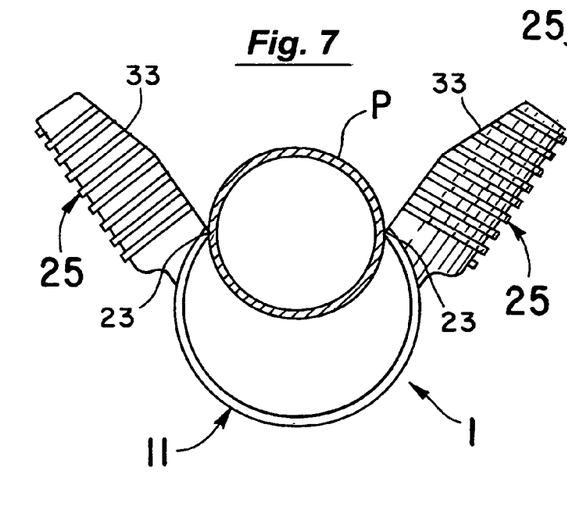
Figure 8:
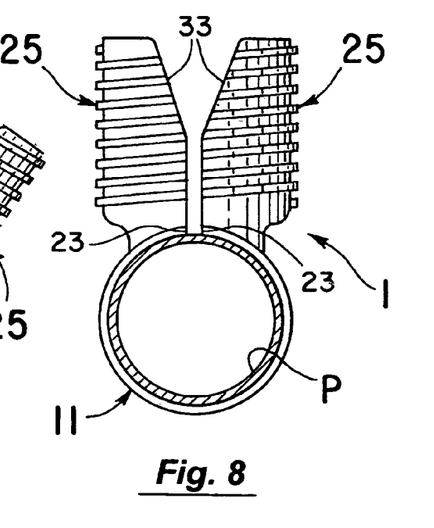

In use as illustrated in FIGS. 5–8, the saddle 1 can be first moved to pass the pipe P between the inclined surfaces 33 of the V-shape (FIGS. 5–6). This will serve to initially move the upright portions 25 and the surfaces 23 at the split 19 of the base portion 11 apart from one another about the axis 17. As the pipe P is further passed between the upright portions 25 toward the base portion 11 (FIG. 7), the upright portions 25 and surfaces 23 are moved farther apart to the fully open position of FIG. 7. At this point, the open saddle 1 is in a position to receive the pipe P in the base portion 11. In doing so, the flexed, resilient saddle 1 of FIG. 7 will snap back (FIG. 8) toward the relaxed or unflexed position receiving the pipe P in the base portion 11. The snap-on, resilient, one-piece saddle 1 is then mounted on the pipe P (FIG. 8).

In the illustrated embodiment, the inner surface 13 of the base portion 11 (see again FIG. 3) is slightly elliptical with the major axis of the elliptical shape extending horizontally substantially through the axis 17. In this manner, the base portion 11 can better receive pipes P of slightly different outer diameters. The major axis in this regard for a saddle 1 designed for a "one inch" pipe would be on the order of 0.010 inch longer than the minor, substantially vertical axis of the ellipse. The base portion 11 can then more easily accommodate "one inch" pipes of different manufacturers, whose tolerances can commonly result in pipes with outer diameters that may vary 0.010 to 0.020 inches.

Figure 9:
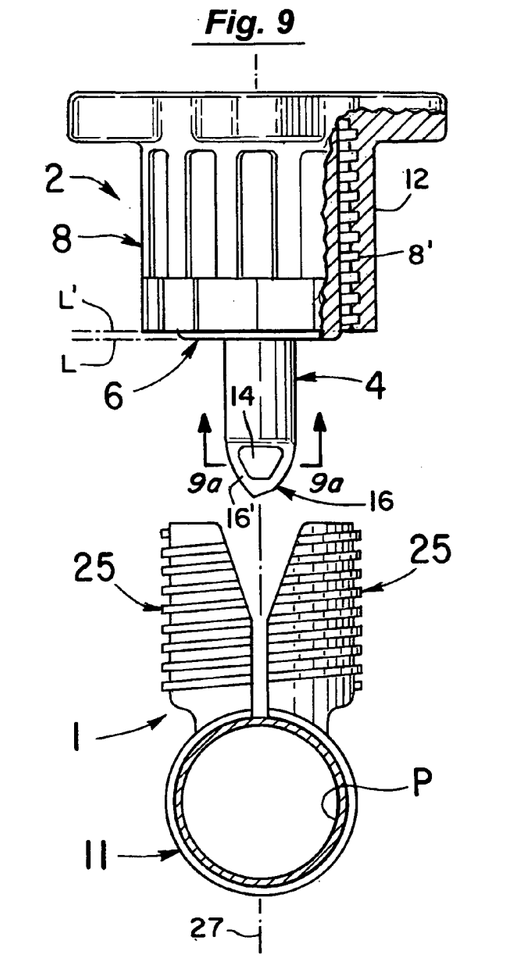
FIGS. 9 and 10 illustrate the initial steps taken to engage the tap and the saddle mounted on the pipe.
Figure 10:
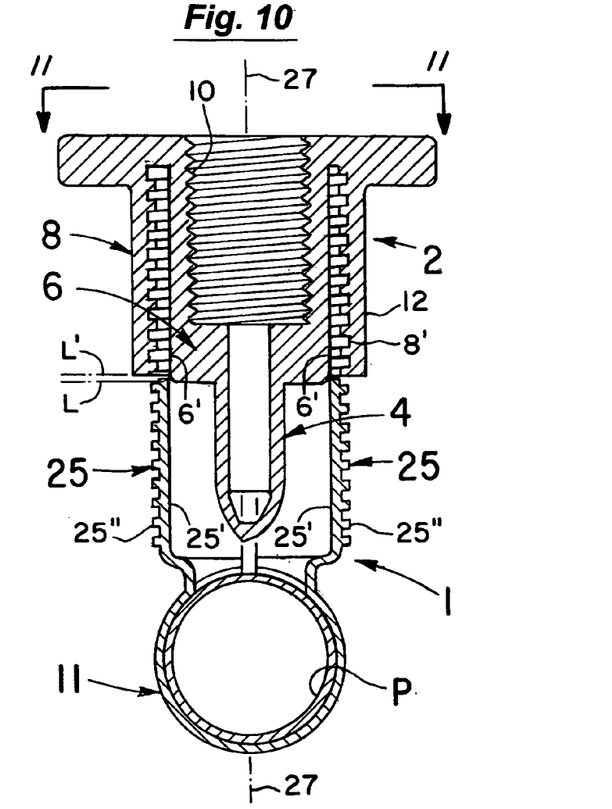

As illustrated in FIGS. 3, 9, and 10, the tap 2 of the present invention has a piercing member 4, inner barrel section 6, and outer nut 8. The piercing member 4 is hollow (FIG. 10) as is the barrel section 6. The barrel section 6 as shown is also internally threaded at 10 to receive the nipple 5 of FIGS. 1 and 2 while the outer barrel surface 6' is preferably unthreaded. The substantially annular nut 8 in turn has an outer surface 12 and an inner surface 8'. The inner surface 8' as shown in FIGS. 9 and 10 is threaded. All of these surfaces of the tap 2 preferably extend along and about a common tap axis which is aligned with the axis 27 in FIGS. 3, 9, and 10.

Figure 11:
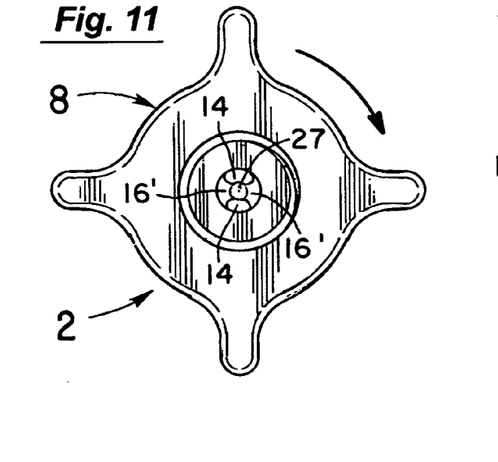
FIG. 11 is a view taken along line 11—11 of FIG. 10.

In operation, the tap 2 of FIG. 9 is moved toward the saddle 1 on the pipe P. The upright portions 25 of the saddle base portion 11 are then initially received (FIG. 10) between the outer barrel surface 6' and the inner surface 8' of the nut 8. Rotation of the nut 8 (FIG. 11) about the axis 27 will thereafter engage the mating threads on the inner nut surface 8' and the outer surfaces 25" of the upright portions 25. Continued rotation of the nut 8 (FIG. 12) will advance the piercing member 4 of the tap 2 toward the saddle base portion 11 to initially pierce or puncture the pipe P. With further advancement, the piercing member 4 will move to the fully tapped position of FIG. 13.

Figure 13:
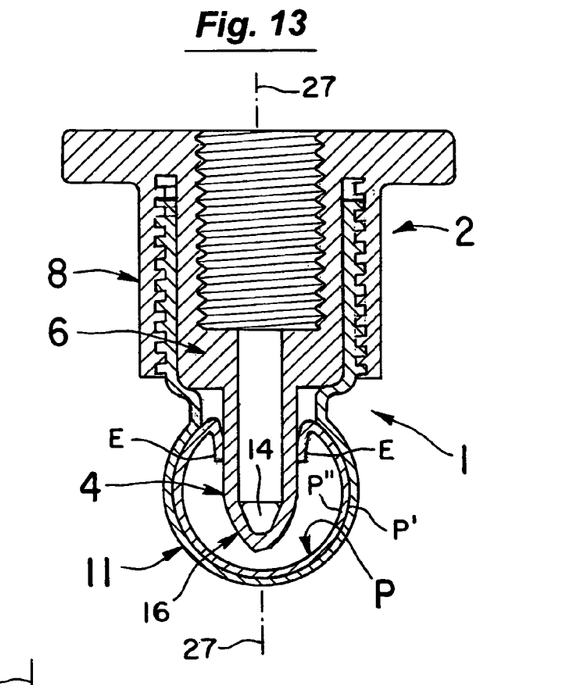

In this position of FIG. 13, the edges E of the pierced pipe P abut and seal strongly against the piercing member 4. The water pressure in the pipe P will further serve to enhance this seal as the water flows in fluid communication through the holes 14 (FIGS. 9 and 13) in the tip section 16 of the piercing member 4 into the main body of the hollow piercing member 4. From there, the water flows into the hollow barrel section 6 leading to the attachments such as the nipple 5 and riser/sprinkler head 3 of FIGS. 1 and 2.

As the tap 2 is initially aligned (see FIGS. 9 and 10) with the axis 27 and advanced toward the saddle 1 to receive the upright portions 25, the outer barrel surface 6' preferably performs a guiding function. That is, the outer surface 6' preferably extends downwardly in the orientation of FIGS. 9 and 10 to a location L along the axis 27. This location L extends below the location L' of the inner nut surface 8'. Stated another way, the location L of the outer barrel surface 6' is spaced from the location L' of the inner nut surface 8' along the axis 27 toward the piercing member 4. The inner nut surface 8' and the outer barrel surface 6' are also radially spaced from each other substantially the same distance as the thickness of the upright portions 25 between its surfaces 25' and 25" (FIG. 10).

Figure 12:
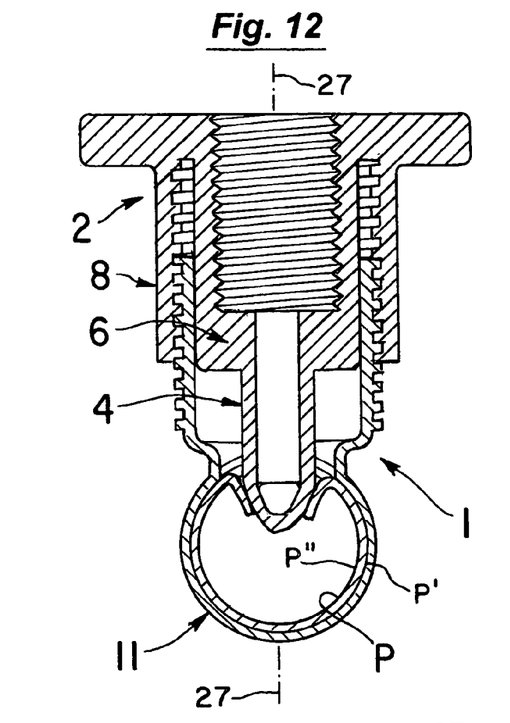
FIGS. 12 and 13 taken with FIGS. 9 and 10 sequentially illustrate the manner in which the tap is advanced on the saddle to pierce the pipe.

Consequently, as the piercing member 4 is advanced toward the upright saddle portions 25 from FIG. 9 to FIG. 10, the outer barrel surface 6' will first contact the inner surface 25' of each upright portion 25 (FIG. 10). The upright portions 25 will then be guided into the space or gap between the outer barrel surface 6' and inner nut surface 8'. Rotation of the nut 8 thereafter will engage the threads and advance the piercing member 4 into and through the outer and inner surfaces P' and P''' of the pipe wall (FIGS. 12 and 13). The guiding function of the outer barrel surface 6' was primarily designed for a saddle such as the one illustrated herein with two, upright portions 25. The upright portions 25 are then guided into the space and the unthreaded outer barrel surface 6' further acts as a support backstop for the upright portions 25. However, the upstanding hollow section of the saddle formed by upright portions 25 could be a single piece extending continuously about the axis 27 if desired and still work with this guiding feature.

Figure 9A:
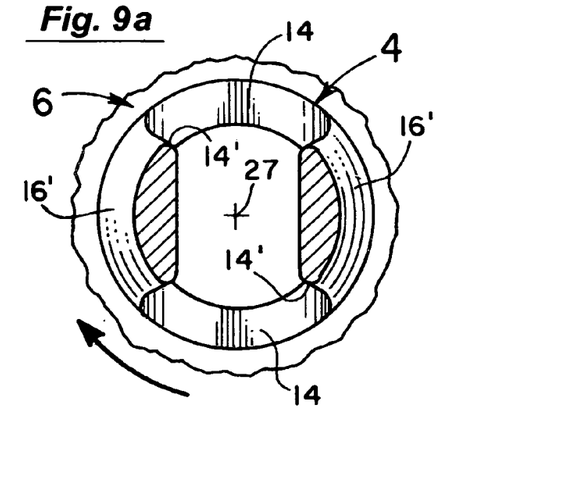
FIG. 9a is an enlarged view taken along line 9a—9a of FIG. 9

In the illustrated embodiment of FIG. 9, the tip section 16 of the piercing member 4 has a substantially arched member 16'. The arched member 16' creates and defines the holes 14 on each side which are in fluid communication with the hollow interior of the piercing member 4. The holes 14 are further defined in part by edges 14' (FIG. 9a) on the arched member 16', which edges 14' extend substantially along the axis 27. These edges 14' are the leading edges as the tip section 16 is rotated about the axis 27 to advance through the outer and inner surfaces P' and P''' of the pipe P. To prevent or at least substantially reduce these leading edges 14' from creating any undesirable shavings as the tip section 16 and holes 14 are advanced through the pipe wall, the leading edges 14' are radiused or rounded (FIG. 9a). The trailing and other edges defining the holes 14 can also be rounded if desired. This rounding feature as well as other features set forth herein are equally adaptable to saddles and taps of designs other than the ones specifically illustrated herein. As for example, the tap need not have an annular nut such as 8 with spaced surfaces 8' and 12 to receive the upright saddle portions 25. Further, the upstanding hollow section of the saddle formed by upright portions 25 could be a single piece extending continuously about the axis 27 as indicated above with the tap including its piercing member received completely within the hollow saddle section.

Another feature of the self-tapping combination of the saddle 1 and tap 2 of the present invention is that it includes an arrangement to releasably lock the tap 2 on the saddle 1. The tap 2 can then be positively locked in place in the preferred piercing position of FIG. 13. Additionally, because the locking arrangement is releasable, the tap 2 can be easily and quickly removed if needed from the saddle 1 and the saddle 1 subsequently removed from the pipe P. The combination of saddle 1 and tap 2 can thus be locked in place on the pipe P yet removed if desired without damaging any of its parts. The combination can then be re-used in the manner of FIGS. 3–13 if desired.

Figure 14:
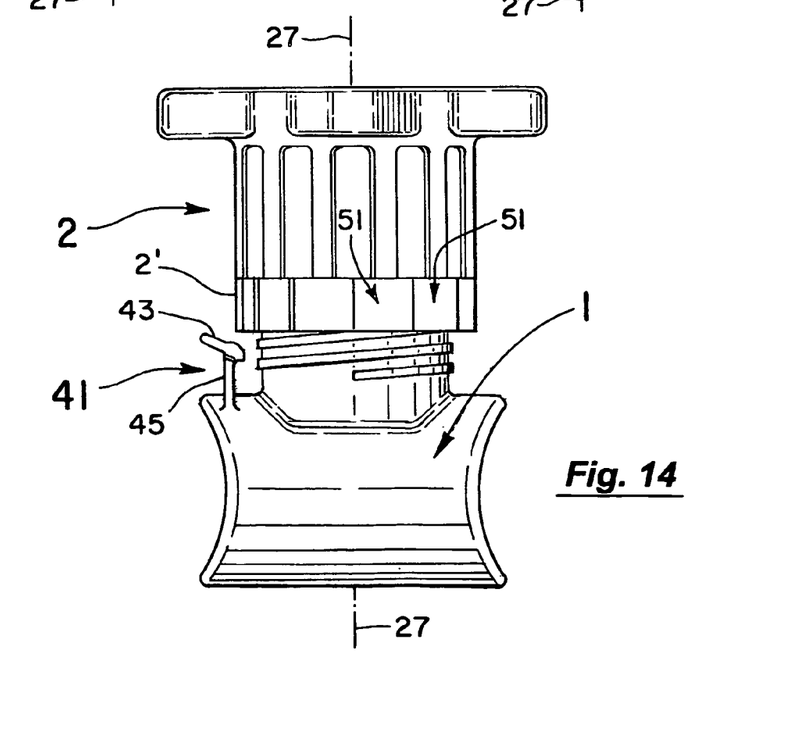
FIG. 14 is a side elevational view of the saddle and tap illustrating the releasable locking arrangement of the present invention.
Figure 15:
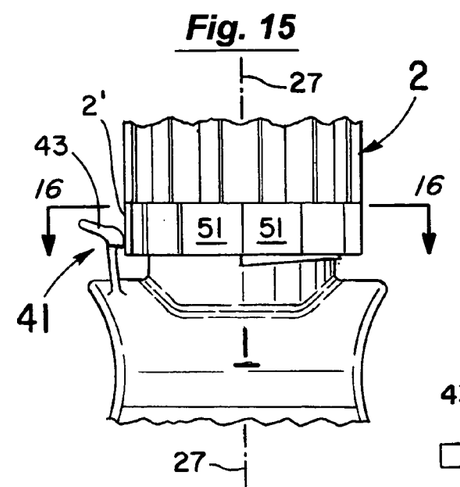
FIGS. 15–20 sequentially illustrates the operation of the locking arrangement of FIG. 14 to lock the tap in place on the saddle.
Figure 16:
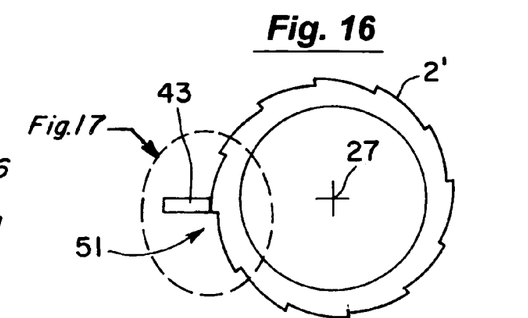
Figures 17, 19, 20:
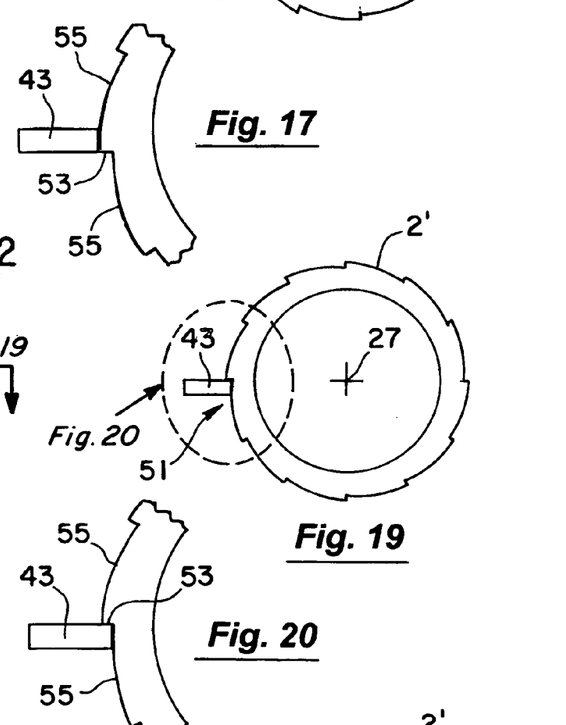

More specifically, the saddle 1 (see FIG. 14) is provided with an upstanding latch 41 which has a head 43 and flexible stem 45. In the relaxed or unflexed position of FIG. 14, the head 43 of the latch 41 is spaced and extends closer to the axis 27 than the lower, outer surface 2' of the tap 2. Consequently, as the tap 2 is rotated about the axis 27 and advanced downwardly in the orientation of FIG. 14, the outer tap surface 2' will contact the inclined head 43 and flex the latch 41 outwardly of the axis 27 to the position of FIG. 15. The outer tap surface 2' as illustrated in FIG. 16 includes at least one and preferably a plurality of recesses or sawteeth 51 extending about the axis 27. Each recess 51 is defined in part by a wall 53 (see FIG. 17) extending substantially along and substantially radially outwardly of the axis 27. The wall 53 has a top and bottom with the bottom being spaced closer to the axis 27. Each recess or sawtooth 51 is further defined in part by a substantially spiral surface 55 (FIG. 17). The surface 55 as shown spirals out from the bottom of the wall 53 in a direction opposite to the rotational direction that advances the tap 2 toward the saddle 1.

Figure 18:
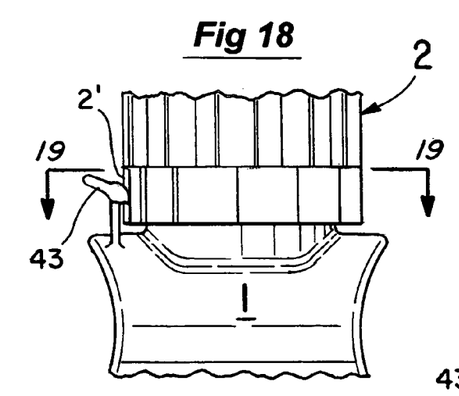

In this manner and as the piercing member 4 of the tap 2 is further rotated and advanced toward the saddle base portion 11 and through the pipe wall to the position of FIGS. 13 and 18, the head 43 of the latch 41 will be received in the illustrated recess 51 of FIGS. 19 and 20 abutting the wall 53 (FIG. 20). In this abutting position, the tap 2 is then positively locked and prevented from being unscrewed or rotated in a direction to withdraw the piercing member 4 from the position of FIG. 13.

In the illustrated embodiment of FIGS. 14–20, there are a plurality of recesses or sawteeth 51. The latch 41 will then repeatedly and progressively be flexed outwardly by the spiral surfaces 55 and click or snap inwardly to the position of FIG. 20 abutting a wall 53. The flexible latch 41 in this regard is biased toward such a locked, abutting position. Although a plurality of recesses or sawteeth 51 are shown, only one is necessary to accomplish the locking function. However, even with a plurality of recesses 51, there is still a desired, final locking position (FIG. 13) with the holes 14 of the tip section 16 aligned with the axis of the pipe P. However, other locking positions are possible with the illustrated embodiment but in all of them, fluid communication would be established with the interior of the pipe P through the holes 14. Such fluid communication would then continue to the interiors of the hollow piercing member 4 and barrel section 6 and on to whatever desired attachment or arrangement (e.g., nipple, riser, sprinkler head, Tee-coupling, fitting, or pipe). It is further noted that although the illustrated recesses 51 are of sawtooth design, the recesses 51 could be elongated indentations extending along and spaced about the axis 27 to receive the latch 41. The recess for the latch 41 as indicated above could also just be a single sawtooth 51 or indentation aligned to lock the piercing member 4 in a predetermined position such as FIG. 13.

Figure 21:
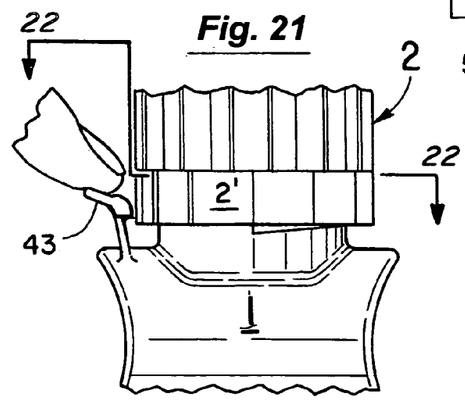
FIGS. 21 and 22 illustrate how the latch of the locking arrangement can be manually flexed outwardly to a position permitting the tap to be easily and quickly removed from the saddle.
Figure 22:
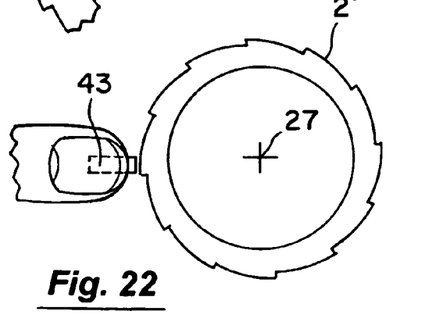

The flexing of the latch 41 also permits the tap 2 to be easily and quickly removed from the saddle 1 without damaging any of the parts. As illustrated in FIGS. 21 and 22, it is only necessary to manually flex the head 43 of the latch 41 outwardly of the tap surface 2' wherein the tap 2 can be unscrewed and removed from the saddle 1. This is desirable as for example, the tap 2 may become clogged and need to be removed and cleaned or it may be damaged and need to be replaced. Additionally, this feature permits the complete combination of saddle 1 and tap 2 to be removed from the pipe P and used again in combination in the manner of FIGS. 3–13. It is understood that this and other features disclosed herein are equally applicable for use with saddles and taps of designs other than those specifically illustrated herein. As for example and as also indicated above, the tap need not have an annular nut such as 8 with spaced surfaces 8' and 12 to receive the upright saddle portions 25. Further, the upstanding hollow section of the saddle formed by upright portions 25 could be a single piece extending continuously about the axis 27 with the tap including its piercing member received completely within the hollow saddle section.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A snap-on, resilient, one-piece pipe saddle (1) for mounting on a pipe, said saddle including:

a base portion (11) with inner and outer surfaces (13,15) extending along and about a first axis (17), said base portion having a split (19) between the inner and outer surfaces extending along a second axis (21) spaced from and substantially parallel to said first axis (17) to form border surfaces (23) respectively extending between said inner and outer surfaces on either side of the split, said saddle further including at least two upright portions (25) extending outwardly from said base portion (11) on respective sides of said split (19), said upright portions extending substantially about a third axis (27) substantially perpendicular to said first axis (17), said resilient saddle in a relaxed position having the two border surfaces (23) of said base portion (11) substantially abutting one another and said respective upright portions (25) substantially abutting one another wherein said pipe can be passed between said upright portions (25) toward said base portion (11) to move said upright portions (25) apart from one another about said first axis (17) and said border surfaces (23) of said base portion (11) apart from one another about said first axis (17) to an open position ready to receive the pipe in said base portion (11) with said flexed, resilient saddle thereafter snapping back toward said relaxed position with said pipe received in said base portion (11) to mount said saddle on the pipe.

2. The saddle of claim 1 wherein said upright portions (25) with said saddle in said relaxed position have border surfaces (33) inclined to said third axis and extending outwardly of each other to form a substantially V-shape, said pipe being passed between said border surfaces (33) forming said V-shape to initiate the moving of the upright portions (25) and border surfaces (23) of the base portion (11) apart from one another and moving said saddle toward said open position.

3. The saddle of claim 2 wherein each border surface (33) of said upright portions (25) is inclined to said third axis (27) at an acute angle.

4. The saddle of claim 3 wherein said acute angle is about 20 degrees.

5. The saddle of claim 2 wherein said upright portions (25) have additional border surfaces (31) substantially abutting one another and extending substantially parallel to said third axis (27) with said saddle in said relaxed position, said inclined border surfaces (33) extending above said additional border surfaces (31) to form said substantially V-shape.

6. The saddle of claim 1 wherein the border surfaces (23) of said base portion (11) are substantially parallel to each other when said saddle is in said relaxed position.

7. The saddle of claim 1 wherein the border surfaces (23) of said upright portions (25) are substantially parallel to each other when said saddle is in said relaxed position.

8. The saddle of claim 1 wherein the inner surface (13) of said base portion (11) in the relaxed position of said saddle is substantially elliptical.

9. The saddle of claim 1 further including a tap (2) having a piercing member (4), said pipe having a wall with inner and outer surfaces, said tap being mountable for rotation about said third axis (27) relative to the saddle on the pipe to advance the piercing member (4) toward the base portion (11) of the saddle and through the wall of said pipe.

10. The saddle of claim 9 further including an arrangement for releasably locking said tap on said saddle.

11. The saddle of claim 10 wherein said arrangement includes at least one latch (41) mounted on said saddle to releasably engage said tap.

12. The saddle of claim 9 further including an arrangement for releasably locking said tap on said saddle in a locked position with the piercing member (4) passing through the wall of the pipe, said tap being releasable from said locked position and rotatable about said third axis (27) relative to said saddle to withdraw said tap from the saddle.

13. The saddle of claim 9 wherein said upright portions (25) have exterior, substantially helical threads therealong and said tap further includes a substantially annular nut (8) with inner (8') and outer (12) surfaces extending along said third axis, the inner surface (8') of said nut having substantially helical thread matable with the exterior threads of said upright potions (25).

14. The saddle of claim 13 wherein the inner surface (8') of said nut extends about said third axis at a first distance and said tap further includes a barrel section (6) with an outer surface (6') extending along and about said third axis at a distance less than said first distance to create a space between the outer barrel surface (6') and the inner nut surface (8'), said upright portions (25) being receivable in said space with said respective threads mating.

15. The saddle of claim 14 wherein said upright portions (25) have inner (25') and outer (25") surfaces spaced a first distance apart and the inner surface (8') of said nut is spaced from the outer surface (6) of said barrel section substantially the same distance as said first distance between the inner and outer surfaces (25',25") of said upright portions (25) to thereby receive the upright portions in the space therebetween.

16. The saddle of claim 15 wherein the inner surface (8') of said nut extends to a first location (L') along said third axis and the outer surface (6') of said barrel section extends to a second location (L) along said third axis spaced from said first location toward said piercing member (4) wherein the outer barrel surface (6') first contacts the inner surface (25') of each upright portion as said tap is advanced to thereby guide said upright portions (25) into the space between the outer barrel surface (6') and the inner nut surface (8').

17. The saddle of claim 9 wherein said piercing member (4) is hollow and includes a tip section (16) with at least two holes (14) therethrough in fluid communication with the interior of said hollow piercing member (4), said holes being defined at least in part by edges (14') extending substantially along said third axis (27), said tip section (16) and holes (14)' including said edges (14') thereof being advanced through the wall of said pipe to establish fluid communicate through said holes between the interior of the pipe and the interior of the hollow piercing member wherein said edges are rounded to substantially prevent creating shavings from said pipe as said tip section and the edges of the holes are rotated and advanced through the wall of said pipe.

18. A removable tap and saddle combination,
said saddle including a base portion removably mountable on a pipe having a wall with inner and outer surfaces, said saddle further including a hollow section mounted to said base portion and extending outwardly thereof,
said tap having a piercing member with a hollow interior, said tap being mountable for rotation in a first direction about an axis relative to said saddle and pipe to advance the piercing member toward the base portion of said saddle and through the wall of said pipe,
said combination further including an arrangement to releasably lock said tap on said saddle in a first, locked position with the piercing member passing through the wall of said pipe.

19. The combination of claim 18 wherein said arrangement includes at least one latch (41) mounted on said saddle to releasably engage said tap in said first, locked position.

20. The combination of claim 19 wherein said tap includes an outer surface (2') extending about and along said axis (27), said outer surface (2') having at least one recess (51) therein to receive said latch and lock said tap in said first, locked position.

21. The combination of claim 20 wherein said recess (51) is defined in part by a wall (53) extending along said axis (27) and substantially radially outwardly of said axis, said latch abutting said wall with said tap in said first, locked position to prevent rotation of said tap about said axis in a direction opposite to said first direction.

22. The combination of claim 21 wherein said latch (41) is mounted for movement toward and away from said axis (27) wherein said latch can be manually moved away from said axis and abutment with said wall (53) to permit said tap to be rotated in said direction opposite said first direction to withdraw said tap from the saddle.

23. The combination of claim 21 wherein said latch is biased toward said first, locked position.

24. The combination of claim 21 wherein said recess wall (53) has a top and bottom with the bottom being spaced closer to said axis (27) than the top, said recess being further defined in part by a substantially spiral surface (55) moving outwardly from the bottom of said wall about said axis in a direction opposite said first direction.

25. The combination of claim 24 wherein the outer surface (2') of said tap includes at least a second recess with a wall and spiral surface wherein said latch is selectively, releasably engagable in the second recess to lock said tap in a second, locked position on said saddle, said second locked position being spaced from said first locked position about said axis.

26. The combination of claim 18 wherein said hollow section of said saddle includes at least two upright portions (25) extending about and along said axis (27).

27. A pipe saddle and tap combination, said saddle (1) including a base portion (11) with inner (13) and outer (15) surfaces extending along and about a first axis (17), said base portion having a split (19) between the inner and outer surfaces extending along a second axis (21) spaced from and substantially parallel to said first axis (17) to form border surfaces (23) respectively extending between said inner (13) and outer (15) surfaces on either side of the split (19), said saddle (1) further including at least two upright portions (25) extending outwardly from said base portion (11) on respective sides of said split (19), said upright portions extending along and substantially about a third axis (27), said third axis (27) being substantially perpendicular to said first axis (17) and said upright portions (25) having exterior threads therealong, said tap (2) including a hollow barrel section (6) with outer and inner surfaces (6',10) extending about and along an axis and a piercing member (4) extending from said barrel section (6) along said tap axis, said tap further including a substantially annular nut (8) with inner and outer surfaces (8',12) extending along and about said tap axis, the inner surface (8') of said nut being spaced outwardly of the outer surface (6') of said barrel section and having interior threads therealong to mate with the exterior threads of said upright portions (25), said upright portions being receivable between the inner surface (8') of said nut and the outer surface (6') of said barrel section with said third (27) and tap axes aligned wherein rotation of said nut (8) about said aligned axes will engage said mating threads and advance the piercing member (4) toward the base portion (11) of said saddle (1).

28. The combination of claim 27 wherein the inner surface (8') of said nut is spaced from the outer surface (6') of said barrel section substantially the same distance as the distance between the inner and outer surfaces (25',25") of said upright portions (25).

29. The combination of claim 28 wherein the inner surface (8') of said nut extends to a first location (L') along said tap axis and the outer surface (6') of said barrel section extends to a second location (L) along said tap axis spaced from said first location (L') toward said piercing member (4) wherein the outer barrel surface (6') first contacts the inner surface (25') of each upright portion as said tap is moved toward said saddle to guide said upright portions (25) into the space between the outer surface (6') of the barrel section and the inner surface (8') of said nut.

30. The combination of claim 27 wherein the inner surface (8') of said nut extends to a first location along said tap axis and the outer surface of said barrel section extends to a second location along said tap axis spaced from said first location toward said piercing member wherein the outer surface of said barrel section first contacts the inner surface of each upright portion as said tap is moved toward said saddle to guide said upright portions into contact with the outer surface of the barrel section.

* * * * *